(12) United States Patent
Hachiya

(10) Patent No.: US 6,636,828 B1
(45) Date of Patent: Oct. 21, 2003

(54) SYMBOLIC CALCULATION SYSTEM, SYMBOLIC CALCULATION METHOD AND PARALLEL CIRCUIT SIMULATION SYSTEM

(75) Inventor: Koutaro Hachiya, Tokyo (JP)

(73) Assignee: NEC Electronics Corp., Kanawa (JP)

( * ) Notice: Subject to any disclaimer, the term of this patent is extended or adjusted under 35 U.S.C. 154(b) by 0 days.

(21) Appl. No.: 09/307,977

(22) Filed: May 10, 1999

(30) Foreign Application Priority Data

May 11, 1998 (JP) .......................................... 10-127738

(51) Int. Cl.$^7$ ................................................ G06F 7/38
(52) U.S. Cl. ............................... 703/2; 708/7; 708/446; 712/7; 712/35
(58) Field of Search ............................ 703/2; 708/446, 708/7; 712/7, 35, 203

(56) References Cited

U.S. PATENT DOCUMENTS

| | | | | |
|---|---|---|---|---|
| 4,825,360 A | * | 4/1989 | Knight | 364/200 |
| 5,159,690 A | * | 10/1992 | Margolus et al. | 395/800 |
| 5,619,680 A | * | 4/1997 | Berkovich et al. | 395/497.04 |
| 5,963,212 A | * | 10/1999 | Bakalash | 345/424 |
| 6,182,270 B1 | * | 1/2001 | Fieldmann et al. | 716/5 |
| 6,205,533 B1 | * | 3/2001 | Margolus | 712/13 |
| 6,397,236 B1 | * | 5/2002 | Garg et al. | 708/446 |

OTHER PUBLICATIONS

William J. McCalla, "Sparse Matrix Methods" of "Fundamentals of Computer–Aided Circuit Simulation", pp. 38–51, 1988.

R. Barrett et al., "Templates for the Solution of Linear Systems: Building Blocks for Iterative Methods", pp. 57–81, 1994.

* cited by examiner

*Primary Examiner*—Samuel Broda
*Assistant Examiner*—Thai Phan
(74) *Attorney, Agent, or Firm*—Scully, Scott, Murphy & Presser

(57) ABSTRACT

The coefficient matrix, corresponding to the simultaneous linear equations to be solved, is divided into a plurality of row sets. The row sets as divided are processed in a parallel fashion, and entries specifying the nonzero elements contained in the first to $n^{th}$ row sets are added to the entry sets E1 to En. Moreover, in regard to each row set, fill-ins which take place at the time of eliminating the $i^{th}$ variable are obtained in a parallel fashion, and entries specifying the fill-ins are added to the entry sets E1 to En. The coefficient matrix is compressed using those entry sets E1 to En.

35 Claims, 11 Drawing Sheets

FIG. 4

$$\left\{\begin{array}{cccccc} 2 & 0 & -1 & 0 & -1 & 0 \\ 0 & 2 & -1 & -1 & 0 & -1 \\ -1 & -1 & 3 & 0 & 0 & 0 \\ 0 & -1 & 0 & 2 & -1 & -1 \\ -1 & 0 & 0 & -1 & 2 & 0 \\ 0 & -1 & 0 & -1 & 0 & 3 \end{array}\right\}$$

FIG. 5(a)

| | | | | | |
|---|---|---|---|---|---|
| * | | * | | * | |
| | * | * | * | | * |

E1 { R1=[2,3,0,0,0,0]  C1=[0,0,2,1,1,1]   11b

| | | | | | |
|---|---|---|---|---|---|
| * | * | * | | | |
| | * | | * | * | * |

E2 { R2=[0,0,2,3,0,0]  C2=[1,2,0,0,1,1]   12b

| | | | | | |
|---|---|---|---|---|---|
| * | | | * | * | |
| | * | | * | | * |

ROWPTR
(INDEX OF FIRST ENTRIES IN INDIVIDUAL ROW)

| 1 | 4 | 9 | 13 | 17 | 22 | 25 |

COLDEX (COLUMN NUMBERS OF CORRESPONDING ENTRIES)

| 1 | 3 | 5 | 2 | 3 | 4 | 5 | 6 | 1 | 2 | 3 | 4 | 5 | 6 | 1 | 2 | 3 | 4 | 5 | 2 | 4 | 6 |

VALUE (VALUES OF COEFFICIENT MATRIX ELEMENTS OF CORRESPONDING ENTRIES)

| 2 | -1 | -1 | 2 | -1 | 0 | -1 | -1 | -1 | 3 | 0 | -1 | -1 | -1 | 0 | 0 | -1 | 2 | -1 | -1 | -1 | 3 |

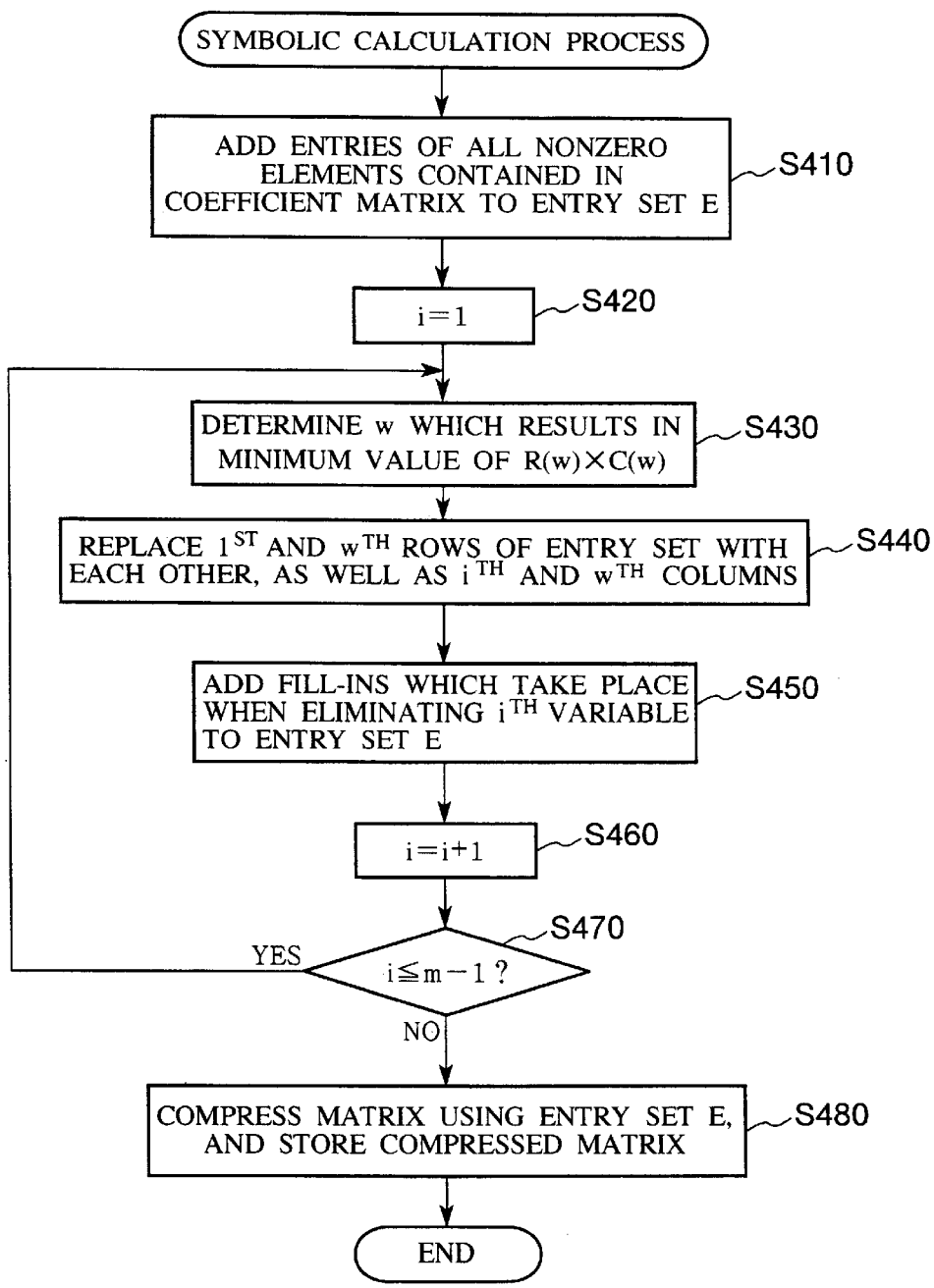

SYMBOLIC CALCULATION SYSTEM, SYMBOLIC CALCULATION METHOD AND PARALLEL CIRCUIT SIMULATION SYSTEM

This application is based on Japanese Patent Application No. 10-127738 filed May 11, 1998, which application is incorporated herein by reference in its entirety.

BACKGROUND OF THE INVENTION

1. Field of the Invention

The present invention relates to a symbolic calculation system and a symbolic calculation method, both for performing a symbolic calculation to solve simultaneous linear equations, and also relates to a parallel circuit simulation system which effects a circuit simulation by solving the simultaneous linear equations.

2. Description of the Related Art

Generally speaking, a process for solving simultaneous linear equations involves a symbolic calculation process and a numerical calculation process. An example of the symbolic calculation process, involved in the process for solving simultaneous linear equations, is described in the third section "Sparse Matrix Methods" of "Fundamentals of Computer-Aided Circuit Simulation" (written by William J. McCalla and published in 1988).

FIG. 11 is a flowchart showing the symbolic calculation process involved in the aforementioned conventional process for solving simultaneous linear equations.

Firstly, a single entry set E is prepared, and information (entries) specifying the positions of nonzero elements contained in a coefficient matrix is sequentially added to the entry set E. Further, an array R(k) representing the number of entries contained in the $k^{th}$ row and an array C(k) representing the number of entries contained in the $k^{th}$ column are also prepared and updated at the time of adding the entries (a step S410).

Next, the use of a variable i, representing a count which is incremented each time the symbolic calculation process is repeated, is declared, and the initialization procedure of substituting the value "1" for "i" is conducted (a step S420). Following this, the value of "W" which results in the minimum value of R(w)×C(w) is determined (a step S430). In obtaining the values of R(w) and C(w) in the step S430, the entries specifying the elements contained in those parts of the matrix which correspond to eliminated variables and equations and the entries specifying diagonal elements are not counted.

After the value of "W" has been determined, the $i^{th}$ and $w^{th}$ rows of the entry set E are replaced with each other, as well as the $i^{th}$ and $w^{th}$ columns thereof (a step S440). Then, fill-ins which take place at the time of eliminating the $i^{th}$ variable are computed, and entries specifying the fill-ins are added to the entry set E (a step S450).

When the step S450 is finished, the variable i is incremented by 1 (a step S460). Next, it is determined whether the value of the variable i exceeds "m−1" (a step S470). When it is determined in the step S470 that the value of the variable i does not exceed m−1, a return is made to the step S430. By repeating the steps S430 to S470, the optimum pivot order and the positions in which the fill-ins take place can be determined.

On the other hand, when it is determined in the step S470 that the value of the variable i exceeds m−1, the coefficient matrix is compressed using the entry set E to which the entries have been added in the steps S410 and S450. Matrix data, obtained as a result of the compression, is stored in a storage area of a storage device or the like (a step S480), and the process shown in the flowchart is terminated. When the process of FIG. 11 is terminated, then the numerical calculation process is conducted.

However, the conventional process for solving the simultaneous linear equations has the following drawbacks:

Firstly, in the case where a parallel computer of distributed memory type executes the symbolic calculation process, a single node has to carry out the steps of the symbolic calculation process one after another. Under this condition, the capacity of a local memory included in the node restricts the size of the coefficient matrix which can be handled.

Secondly, in the case where the coefficient matrix which is a square matrix has a size of m×m (which indicates the number of rows and columns included in the coefficient matrix), the time required for completing the symbolic calculation process increases substantially in proportion to $m^1$ to $m^3$. Hence, as the coefficient matrix size becomes large and as the number of entries which are added to the entry set becomes excessive, the symbolic calculation process cannot be finished within a practical length of time.

The above-described drawbacks occur also in the case of performing a circuit simulation which entails the process for solving simultaneous linear equations.

SUMMARY OF THE INVENTION

The present invention has been made in consideration of the above drawbacks, and it is accordingly an object of the present invention to provide a symbolic calculation system and a symbolic calculation method, which can handle a large-scale matrix and whose calculation time is short.

It is another object of the present invention to provide a parallel circuit simulation system which can perform a large-scale circuit simulation at high speed.

According to the first aspect of the present invention having the above-described objects, there is provided a symbolic calculation system which performs a symbolic calculation to solve simultaneous linear equations, comprising:

a plurality of nodes each having an element processor and local memory including a program area which stores a predetermined program to be executed by the corresponding element processor and a work area used by the element processor, and an interconnection network which interconnects the plurality of nodes, wherein the element processors of the plurality of nodes are capable of cooperating with each other, the symbolic calculation system comprising a first computer which is connected to the interconnection network, and which divides a matrix, representing the simultaneous linear equations to be solved, into a plurality of row sets each comprising at least one of rows of the matrix, wherein each of the plurality of nodes corresponds to each row set divided by the first computer, and each of the element processor executes the predetermined program stored in the program area thereby each of the plurality of nodes:

adds entries specifying nonzero elements contained in the row sets associated with the plurality of nodes to a plurality of entry sets which are in one-to-one correspondence with the plurality of row sets;

sequentially attains a first variable which specifies an unknown that can be eliminated with a minimum number of calculations, among a plurality of unknowns which are designated by a second variable whose value sequentially changes from 1 up to a value equal to the number of rows included in the matrix, by cooperating with other nodes;

replaces one row specified by the first variable and another row specified by the second variable with each other, among the rows of the matrix, by cooperating with other nodes;

replaces one column specified by the first variable and another column specified by the second variable with each other, among columns of the matrix, by cooperating with other nodes;

obtains fill-ins belonging to the associated row sets from a plurality of fill-ins which occur in eliminating the unknown in regard to the matrix including the rows and/or columns replaced with each other, and further adding entries specifying the obtained fill-ins to the plurality of entry sets to the entry sets.

According to this symbolic calculation systems, the plurality of nodes carry out the addition of the entries in a parallel fashion. This enables the symbolic calculation in solving the simultaneous linear equations to be performed at high speed.

In the case of realizing the aforementioned symbolic calculation systems with parallel computers of distributed memory type, the data amount corresponding to the product of the reciprocal of the number of parts in which the matrix is divided and the amount of data when a single node performs the addition of the entries to an entry set will be almost satisfactory as the amount of data to be stored in the local memory included in each of nodes which realize the plurality of first and second entry adders. In this case, the capacity of the local memory in each node does not restrict the size of the coefficient matrix which can be handled. Hence, the process for solving the simultaneous linear equations can be conducted on a large scale.

In the above-described symbolic calculation system, the first computer may be realized by any one of the plurality of nodes.

In this case, any one of the plurality of nodes may attain the first variable which determines the minimum number of calculations.

Moreover, any one of the plurality of nodes may replace one row specified by the first variable and another row specified by the second variable with each other.

Any one of the plurality of nodes may further replace one column specified by the first variable and another column specified by the second variable with each other.

The above-described symbolic calculation system may further comprise a second computer which is connected to the interconnection network and which compresses the matrix based on contents of the plurality of entry sets to which the entries have been added.

In this case, the second computer may be realized by any one of the plurality of nodes.

The above-described symbolic calculation system may further comprise a third computer which is connected to the interconnection network, and which creates a lower left rectangular matrix and an upper right triangular matrix, based on the matrix as compressed, and which performs a forward substitution with respect to the lower left rectangular matrix and performs a backward substitution with respect to the upper right rectangular matrix by using solutions obtained as a result of the forward substitution, in order to create data representing solutions of the simultaneous linear equations.

In this case, the third computer may be realized by any one of the plurality of nodes.

According to the second aspect of the present invention having the above-described objects, there is provided a symbolic calculation system which performs a symbolic calculation to solve simultaneous linear equations, comprising:

a matrix divider which divides a matrix, representing the simultaneous linear equations to be solved, into a plurality of row sets each comprising at least one of rows of the matrix;

a plurality of first entry adders, each of which is associated with one of the plurality of row sets divided by the matrix divider, and which add entries specifying nonzero elements contained in the row sets associated with the plurality of first entry adders to a plurality of entry sets that are in one-to-one correspondence with the plurality of row sets;

a pivot selector which sequentially attains a first variable specifying specifies an unknown that can be eliminated with a minimum number of calculations, among a plurality of unknowns which are designated by a second variable whose value sequentially changes from 1 up to a value equal to the number of rows included in the matrix;

a pivot replacer which replaces one row specified by the first variable and another row specified by the second variable with each other, among the rows of the matrix, and replaces one column specified by the first variable and another column specified by the second variable with each other, among columns of the matrix; and a plurality of second entry adders, provided in one-to-one correspondence with the plurality of first entry adders, and which obtain fill-ins belonging to the associated row sets from a plurality of fill-ins that occur in eliminating the unknown in regard to the matrix including the rows and columns replaced with each other by the pivot replacer, and which add entries specifying the obtained fill-ins to the plurality of entry sets to which the entries have been added by the plurality of first entry adders that are in one-to-one correspondence with the plurality of second entry adders.

According to the third aspect of the present invention, there is provided a symbolic calculation system which performs a symbolic calculation to solve simultaneous linear equations, comprising:

a plurality of first entry adders, each of which associated with one of a plurality of row sets each comprising at least one of different rows of a matrix representing the simultaneous linear equations to be solved, and which add entries specifying nonzero elements contained in the row sets associated with the plurality of first entry adders to a plurality of entry sets that are in one-to-one correspondence with the plurality of row sets;

a pivot selector which sequentially attains a first variable specifying an unknown that can be eliminated with a minimum number of calculations, among a plurality of unknowns which are designated by a second variable whose value sequentially changes from 1 up to a value equal to the number of rows included in the matrix;

a pivot replacer which replaces one row specified by the first variable and another row specified by the second variable with each other, among the rows of the matrix, and which replaces one column specified by the first variable and another column specified by the second variable with each other, among columns of the matrix; and a plurality of second entry adders, provided in one-to-one correspondence with the plurality of first entry adders, and which obtain fill-ins belonging to the associated row sets from a plurality of fill-ins that occur in eliminating the unknown in regard to the matrix including the rows and columns replaced with each other by the pivot replacer, and which add entries specifying the obtained fill-ins to the plurality of entry sets to which the entries have been added by the plurality of first entry adders that are in one-to-one correspondence with the plurality of second entry adders.

According to these symbolic calculation systems, the plurality of first and second entry adders carry out the addition of the entries in a parallel fashion. This enables the symbolic calculation in solving the simultaneous linear equations to be performed at high speed.

In the case of realizing the aforementioned symbolic calculation systems with parallel computers of distributed memory type, the data amount corresponding to the product of the reciprocal of the number of parts in which the matrix is divided and the amount of data when a single node performs the addition of the entries to an entry set will be almost satisfactory as the amount of data to be stored in the local memory included in each of nodes which realize the plurality of first and second entry adders. In this case, the capacity of the local memory in each node does not restrict the size of the coefficient matrix which can be handled. Hence, the process for solving the simultaneous linear equations can be conducted on a large scale.

According to the fourth aspect of the present invention having the aforementioned objects, there is provided a parallel circuit simulation system comprising:

a plurality of nodes each having an element processor and local memory including a program area which stores a predetermined program to be executed by the corresponding element processor and a work area used by the element processor, and an interconnection network which interconnects the plurality of nodes, wherein the element processors of the plurality of nodes are capable of cooperating with each other, the parallel circuit simulation system comprising a first computer which is connected to the interconnection network, the first computer dividing a circuit to be simulated into a plurality of circuit pieces, preparing circuit piece matrix representing circuit equations corresponding to divided circuit pieces respectively, and transmitting the prepared circuit piece matrix to the plurality of nodes, wherein each of the element processor executes the predetermined program stored in the program area thereby the plurality of nodes:

executes symbolic calculation on the circuit piece matrix transmitted by the first computer, executes numeric calculation on the result of the symbolic calculation executed by each node, and resolves the circuit equation represented by the received circuit piece matrix, the parallel circuit simulation system comprises:

a second computer which is connected to the interconnection network, and which prepares a circuit matrix of connected circuits including connected circuit pieces, based on the obtained resolution of the circuit equation for the circuit pieces; and a third computer which is connected to the interconnection network, and which divides the prepared circuit matrix of the connected circuits into a plurality of row sets each comprising at least one of rows of the matrix, and which transmits the plurality of row sets to the plurality of nodes respectively, wherein each element processor executes the predetermined program stored in the program area, thereby each of the plurality of nodes further:

adds entries specifying nonzero elements contained in the row sets associated with the plurality of nodes to a plurality of entry sets which are in one-to-one correspondence with the plurality of row sets;

sequentially attains a first variable which specifies an unknown that can be eliminated with a minimum number of calculations, among a plurality of unknowns which are designated by a second variable whose value sequentially changes from 1 up to a value equal to the number of rows included in the matrix, by cooperating with other nodes;

replaces one row specified by the first variable and another row specified by the second variable with each other, among the rows of the matrix, by cooperating with other nodes;

replaces one column specified by the first variable and another column specified by the second variable with each other, among columns of the matrix, by cooperating with other nodes;

obtains fill-ins belonging to the associated row sets from a plurality of fill-ins which occur in eliminating the unknown in regard to the matrix including the rows and/or columns replaced with each other, and further adds entries specifying the obtained fill-ins to the plurality of entry sets to the entry sets.

In the above-described parallel circuit simulation system, any of the first to third computers may be realized by any one of the plurality of nodes.

The above-described parallel circuit simulation system may further comprise a fourth computer which is connected to the interconnection network, and which compresses the matrix based on contents of the plurality of entry sets to which the entries have been added.

In this case, the fourth computer may be realized by any one of the plurality of nodes.

According to the fifth aspect of the present invention having the above-described objects, there is provided a symbolic calculation method for performing a symbolic calculation to solve simultaneous linear equations, comprising:

dividing a matrix, which represents the simultaneous linear equations to be solved, into a plurality of row sets each comprising at least one of rows of the matrix;

adding, in parallel, entries specifying nonzero elements contained in the plurality of row sets divided by the dividing to a plurality of entry sets which are in one-to-one correspondence with the plurality of row sets;

sequentially attaining a first variable which specifies an unknown that can be eliminated with a minimum number of calculations, among a plurality of unknowns which are designated by a second variable whose value sequentially changes from 1 up to a value equal to the number of rows included in the matrix;

replacing one row specified by the first variable and another row specified by the second variable with each other, among the rows of the matrix, and replacing one column specified by the first variable and another column specified by the second variable with each other, among columns of the matrix; and obtaining, in parallel, fill-ins belonging to the plurality of row sets from a plurality of fill-ins which occur in eliminating the unknown in regard to the matrix including the rows and columns replaced with each other by the replacing, and adding, in parallel, entries specifying the obtained fill-ins to the plurality of entry sets to which the entries specifying the nonzero elements contained in the plurality of row sets have been added in parallel.

The above-described symbolic calculation method may further comprise compressing the matrix, based on contents of the plurality of entry sets to which the entries specifying the nonzero elements contained in the plurality of row sets and the entries specifying the obtained fill-ins have been added.

According to the sixth aspect of the present invention having the aforementioned objects, there is provided a parallel circuit simulation system comprising:

- a circuit divider which divides a circuit to be simulated into partial circuits;
- a plurality of partial circuit matrix calculators, each of which is associated with one of the partial circuits divided by the circuit divider, and which creates partial circuit matrices representing circuit equations of the partial circuits associated with the plurality of partial circuit matrix calculator;
- a plurality of partial circuit symbolic calculators, each of which is associated with one of the partial circuits, and which perform symbolic calculations based on the partial circuit matrices representing the circuit equations of the associated partial circuits and created by the plurality of partial circuit matrix calculators;
- a plurality of partial circuit numerical calculators, each of which is associated with one of the partial circuits, and which solve the circuit equations of the associated partial circuits by performing numerical calculations using calculation results obtained as a result of the symbolic calculations which the plurality of partial circuit symbolic calculators have performed based on the partial circuit matrices representing the circuit equations of the associated circuit sections;
- a combination circuit matrix calculator which creates a combination circuit matrix representing circuit equations of a combination circuit that is a combination of the partial circuits, based on solutions of the circuit equations of the partial circuits which have been solved by the plurality of partial circuit numerical calculators;
- a combination circuit symbolic calculator which performs symbolic calculations based on the combination circuit matrix created by the combination circuit matrix calculator; and
- a combination circuit numerical calculator which solves the circuit equations of the combination circuit by performing numerical calculations using calculation results obtained as a result of the symbolic calculations performed by the combination circuit symbolic calculator;

wherein the combination circuit symbolic calculator comprises:

- a matrix divider which divides the combination circuit matrix into a plurality of row sets each comprising at least one of rows of the combination circuit matrix;
- a plurality of first entry adders, each of which is associated with one of the plurality of row sets divided by the matrix divider, and which add entries specifying nonzero elements contained in the row sets associated with the plurality of first entry adders to a plurality of entry sets that are in one-to-one correspondence with the plurality of row sets;
- a pivot selector which sequentially attains a first variable specifying specifies an unknown that can be eliminated with a minimum number of calculations, among a plurality of unknowns which are designated by a second variable whose value sequentially changes from 1 up to a value equal to the number of rows included in the combination circuit matrix;
- a pivot replacer which replaces one row specified by the first variable and another row specified by the second variable with each other, among the rows of the combination circuit matrix, and which replaces one column specified by the first variable and another column specified by the second variable with each other, among columns of the combination circuit matrix; and
- a plurality of second entry adders, provided in one-to-one correspondence with the plurality of first entry adders, and which obtain fill-ins belonging to the associated row sets from a plurality of fill-ins which occur in eliminating the unknown in regard to the combination circuit matrix including the rows and columns replaced with each other by the pivot replacer, and which add entries specifying the obtained fill-ins to the plurality of entry sets to which the entries have been added by the plurality of first entry adders that are in one-to-one correspondence with the plurality of second entry adders.

According to the seventh aspect of the present invention having the aforementioned objects, there is provided a computer usable storage medium containing a computer readable program stored therein for causing a computer to serve as:

- a matrix divider which divides a matrix, representing simultaneous linear equations to be solved, into a plurality of row sets each comprising at least one of rows of the matrix;
- a plurality of first entry adders, each of which is associated with one of the plurality of row sets divided by the matrix divider, and which add entries specifying nonzero elements contained in the row sets associated with the plurality of first entry adders to a plurality of entry sets that are in one-to-one correspondence with the plurality of row sets;
- a pivot selector which sequentially attains a first variable specifying an unknown that can be eliminated with a minimum number of calculations, among a plurality of unknowns which are designated by a second variable whose value sequentially changes from 1 up to a value equal to the number of rows included in the matrix;
- a pivot replacer which replaces one row specified by the first variable and another row specified by the second variable with each other, among the rows included in the matrix, and replaces one column specified by the first variable and another column specified by the second variable with each other, among columns of the matrix; and
- a plurality of second entry adders, provided in one-to-one correspondence with the plurality of first entry adders, and which obtain fill-ins belonging to the associated row sets from a plurality of fill-ins that occur in eliminating the unknown in regard to the matrix including the rows and columns replaced with each other by the pivot replacer, and add entries specifying the obtained fill-ins to the plurality of entry sets to which the entries have been added by the plurality of first entry adders that are in one-to-one correspondence with the plurality of second entry adders.

According to the eighth aspect of the present invention having the aforementioned objects, there is provided a program signal embedded in a carrier wave, for causing a computer to serve as:

a matrix divider which divides a matrix, representing simultaneous linear equations to be solved, into a plurality of row sets each comprising at least one of rows of the matrix;

a plurality of first entry adders, each of which is associated with one of the plurality of row sets divided by the matrix divider, and which add entries specifying non-zero elements contained in the row sets associated with the plurality of first entry adders to a plurality of entry sets that are in one-to-one correspondence with the plurality of row sets;

a pivot selector which sequentially attains a first variable specifying specifies an unknown that can be eliminated with a minimum number of calculations, among a plurality of unknowns which are designated by a second variable whose value sequentially changes from 1 up to a value equal to the number of rows included in the matrix;

a pivot replacer which replaces one row specified by the first variable and another row specified by the second variable with each other, among the rows of the matrix, and which replaces one column specified by the first variable and another column specified by the second variable with each other, among columns of the matrix; and a plurality of second entry adders, provided in one-to-one correspondence with the plurality of first entry adders, and which obtain fill-ins belonging to the associated row sets from a plurality of fill-ins that occur in eliminating the unknown in regard to the matrix including the rows and columns replaced with each other by the pivot selector, and which add entries specifying the obtained fill-ins to the plurality of entry sets to which the entries have been added by the plurality of first entry adders that are in one-to-one correspondence with the plurality of second entry adders.

BRIEF DESCRIPTION OF THE DRAWINGS

FIG. 4 is a diagram exemplifying a coefficient matrix which is input from a workstation to the parallel computer according to the first embodiment of the present invention;

FIGS. 5(a) to 5(c) are diagrams for explaining an example of the symbolic calculation process according to the first embodiment of the present invention;

FIG. 7 is a diagram illustrating the structure of compressed, stored matrix data employed in the aforementioned example according to the first embodiment of the present invention;

FIG. 11 is a flowchart showing a conventional symbolic calculation process.

DETAILED DESCRIPTION OF THE PREFERRED EMBODIMENT

Preferred embodiments of the present invention will now be described with reference to the accompanying drawings.

First Embodiment

Figure 1:
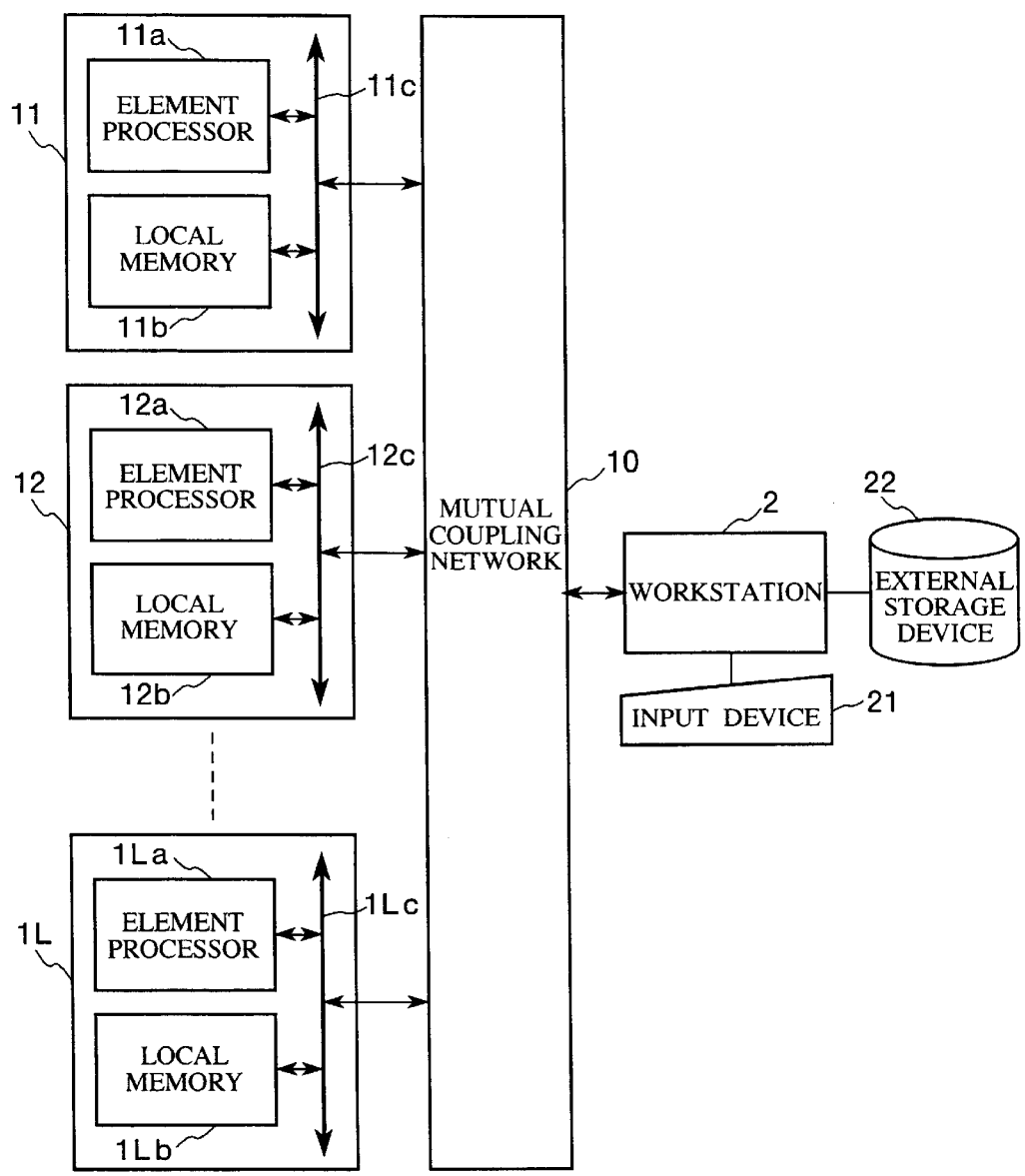
FIG. 1 is a block diagram illustrating the structure of a parallel computer adopted in the first embodiment of the present invention.

FIG. 1 is a block diagram illustrating the structure of the parallel computer adopted in the first embodiment of the present invention.

As illustrated, the parallel computer 1 has a plurality of nodes 11 to 1L. The nodes 11 to 1L are coupled to each other via a mutual coupling network 10.

Each of the nodes 11 to 1L comprises an element processor, a local memory and a bus. The reference symbols 11a to 1La denote the element processors of the nodes 11 to 1L, respectively. The reference symbols 11b to 1Lb denote the local memories of the nodes 11 to 1L, respectively. The reference symbols 11c to 1Lc denote the buses of the nodes 11 to 1L, respectively.

The element processor and local memory included in each node are connected to each other via the bus which is also included therein. The busses 11c to 1Lc are connected to the mutual coupling network 10.

The element processors 11a to 1La exchange messages with each other through the mutual coupling network 10. Moreover, the element processor of one node remotely accesses the local memory of another node.

By so doing, a processing request is sent from one node to another node in the parallel computer 1. The requested processing is carried out in a parallel fashion as a result.

The local memories 11b to 1Lb of the nodes store programs to be executed by their corresponding element processors of the nodes, and are used as work areas for the element processors.

A workstation 2 is connected to the mutual coupling network 10 of the parallel computer 1. The workstation 2 comprises an input device 21 and an external storage device 22. The simultaneous linear equations to be calculated (or its coefficient matrix) are input to the input device 21 of the workstation 2. The workstation 2 sends the coefficient matrix to the parallel computer 1, and requests the parallel computer 1 to execute a process for solving simultaneous linear equations.

The process for solving simultaneous linear equations, which is carried out by the parallel computer 1 of FIG. 1 according to the first embodiment, will now be described.

Figure 2:
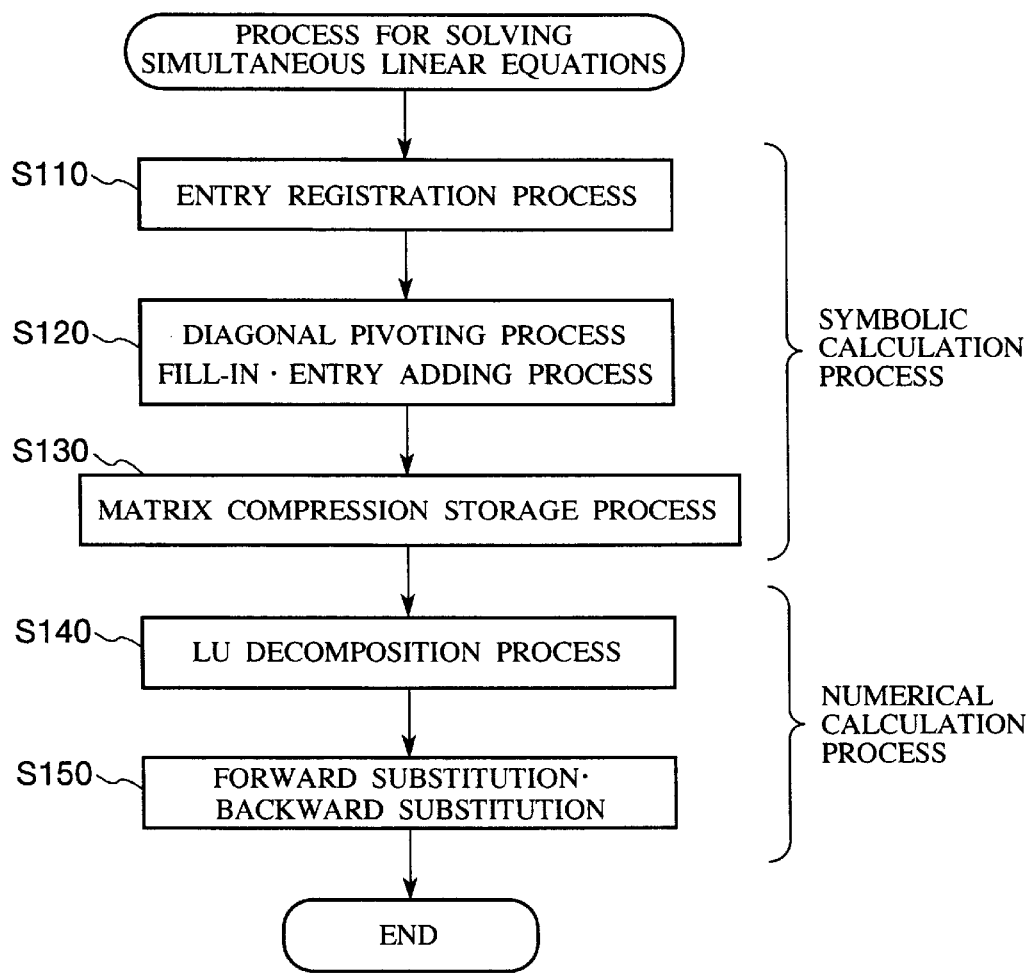
FIG. 2 is a flowchart showing the outline of a process for solving simultaneous linear equations according to the first embodiment of the present invention.

FIG. 2 is a flowchart showing the outline of the process for solving simultaneous linear equations according to the first embodiment.

The process for solving simultaneous linear equations is accomplished by sequentially executing an entry registration process (a step S110), a diagonal pivoting process (a step S120), a matrix compression storage process (a step S130), an LU decomposition process (a step S140) and a forward-backward substitution process (a step S150). Of those processes, the steps S110 to S130 are executed as the symbolic calculation process, while the steps S140 and S150 are executed as the numerical calculation process.

In the step S110 of the entry registration process, information units (entries) specifying the positions of nonzero elements in the coefficient matrix sent from the workstation 2 are added to a plurality of entry sets E.

The entry registration process is effected in a parallel fashion in units of row sets which will be explained later. In this process, the entry sets E which are a plurality of empty sets are first prepared one for each row set. Then, the entry <i, j> which indicates the intersection of the $i^{th}$ row and the $j^{th}$ column where a nonzero element in the coefficient matrix is present, is added element by element to the entry sets prepared for the row sets containing such nonzero elements.

In the step S120 of the diagonal pivoting process, rows and columns are replaced with each other in the coefficient matrix. Of the zero elements contained in the original coefficient matrix, the elements (fill-ins) which become nonzero values as a result of the LU decomposition process, are also added to the entry sets E prepared for the row sets containing the fill-ins.

In the step S130 of the matrix compression storage process, areas for storing nonzero elements attained after the LU decomposition process are reserved, using the entry sets E obtained through the processes up to the step S120. The values of the elements in the coefficient matrix are stored in the reserved areas.

In the step S140 of the LU decomposition process, the process for factorizing the coefficient matrix into the product of a lower left triangular matrix L and an upper right triangular matrix U is performed. In this embodiment, the LU decomposition process is carried out with values being overwritten in an area in which the coefficient matrix has been stored.

In the step S150 of the forward-backward substitution process, a linear equation expressed by the coefficient matrix is solved. In this process, when the linear equation expressed by the coefficient matrix is Ax=b (where A is the coefficient matrix, x is a solution vector, and b is a right-side vector), the forward substitution procedure for obtaining the solution of "Y" by solving the equation "Ly=b" and the backward substitution procedure for obtaining the solution of "x" by solving the equation "Ux=y" are performed.

Figure 3:
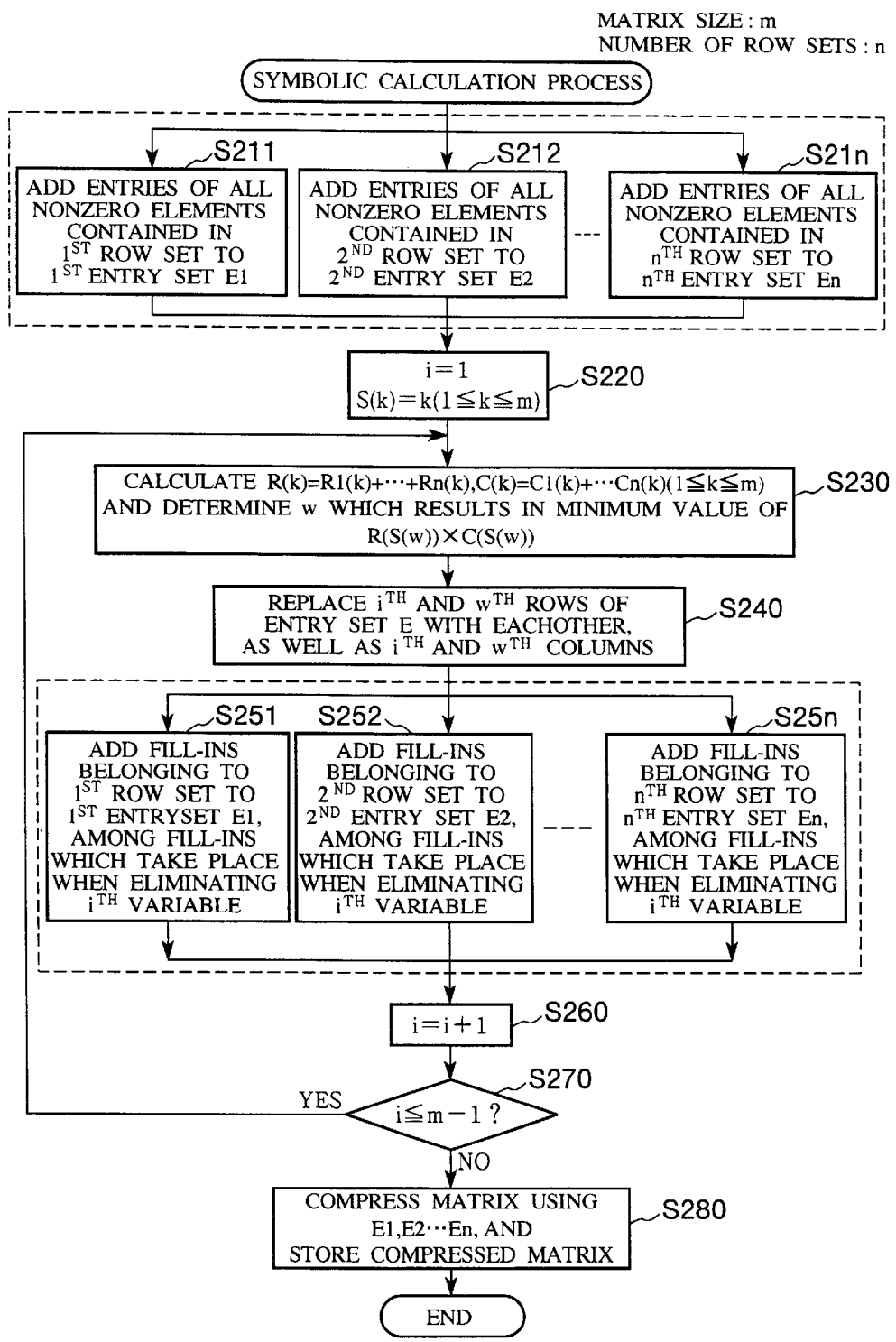
FIG. 3 is a flowchart showing the details of a symbolic calculation process shown in FIG. 2.

FIG. 3 is a flowchart which shows in detail the symbolic calculation process (the steps S110 to S130) of FIG. 2.

In this flowchart, steps S211 to S21L are executed as the process shown as the step S110 in FIG. 2. Steps S220 to S270 shown in FIG. 3 are executed as the process shown as the step S120 in FIG. 2. A step S280 in FIG. 3 is executed as the process shown as the step S130 in FIG. 2.

By operating the input device 21 of the workstation 2, a user inputs simultaneous linear equations to be solved to the workstation 2. Thereafter, by operating the input device 21, the user inputs to the workstation 2 an instruction to solve the simultaneous linear equations which have been input with the input device 21 to the workstation 2.

Then, the workstation 2 creates a coefficient matrix representing the simultaneous linear equations, and divides the coefficient matrix into a plurality of row sets. In order to facilitate understanding, the size (the number of rows) of the coefficient matrix will be hereinafter referred to as "m", while the number of row sets will be referred to as "n" ($n \geq 1$).

Next, the workstation 2 sends the created coefficient matrix to the parallel computer 1, and requests the parallel computer 1 to execute the symbolic calculation process.

Of the element processors 11a to 1La of the nodes 11 to 1L in the parallel computer 1, the element processor of the node which has received the request for execution of the symbolic calculation process transmits n row sets forming the coefficient matrix in one-to-one correspondence to n nodes of the nodes 11 to 1L through the mutual coupling network 10. The node which has received the request for execution of the symbolic calculation process may transmit one row set within the node itself through inter-process communications.

In order to facilitate understanding, let it be assumed that the node 11 has received the request for execution of the symbolic calculation process. Let it be further assumed that the nodes 11 to 1n have received the row sets.

The n nodes, 11 to 1n, which have received the row sets forming the coefficient matrix, operate in a parallel fashion. The element processors 11a to 1na of the nodes 11 to 1n reserve areas in their corresponding local memories of the nodes 11 to 1n. Then, the element processors 11a to 1na prepare a plurality of entry sets in one-to-one correspondence with the received row sets, and store the entry sets in the aforementioned areas.

The entry sets prepared by the element processors 11a to 1na will be hereinafter referred to as the entry sets E1 to En.

Furthermore, the element processors 11a to 1na reserve areas for storing arrays R1 to Rn in their corresponding local memories of the nodes to which the element processors 11a to 1na belong. An array Rp ($1 \leq p \leq n$) is an array whose $k^{th}$ element represents the number Rp(k) ($1 \leq k \leq m$) of entries included in the $k^{th}$ row of a matrix in which those of the coefficient matrix elements which do not belong to the row set received by the node 1p are all expressed as zero.

Moreover, the element processors 11a to 1na reserve areas for storing arrays C1 to Cn in their corresponding local memories of the nodes to which the element processors 11a to 1na belong. An array Cp is an array whose $k^{th}$ element represents the number Cp(k) of entries included in the $k^{th}$ column of the matrix in which those of the coefficient matrix elements which do not belong to the row set received by the node 1p are all expressed as zero.

Next, the element processors 11a to 1na add entries specifying the nonzero elements of the elements contained in their respective row sets as received to the entry sets E1 to En prepared by the element processors 11a to 1na, respectively. When adding the entries to the entry sets E1 to En, the element processors 11a to 1na update the values of the elements contained in the arrays R1 to Rn and C1 to Cn (steps S211 to S21n).

When the nodes 11 to 1 n have finished the steps S211 to S21n, the element processor of one of the nodes 11 to 1L in the parallel computer 1 prepares the variable i as a count to be incremented each time the symbolic calculation process is repeated, and performs the initialization procedure of substituting 1 for i (in order to facilitate understanding, let it be assumed that the element processor 11a of the node 11, for example, prepares the variable i).

Furthermore, the element processor 11a reserves in the local memory 11b an area for storing a replacement array S, and stores the replacement array S in the reserved area (a step S220).

The replacement array S shows the result of the replacement of rows and columns which has been performed in the coefficient matrix by a step S240 that will be explained later. The replacement array S contains m elements. Of the m elements, the $w^{th}$ element $S(w)$ ($1 \leq w \leq m$) is a value representing in what ordinal rank the $w^{th}$ column of the coefficient matrix after the replacement of rows and columns in the step S240, was located at the point the coefficient matrix was received from the workstation 2. It should be noted that in the step S220, the replacement array S is prepared in the state wherein no rows and columns have been replaced with each other.

Next, the element processor 11 a remotely accesses the local memories 11b to 1n of the nodes 11 to 1n, and acquires the arrays R1 to Rn, the arrays C1 to Cn and the entry sets E1 to En therefrom.

Then, the element processor 11a attains an array R whose $j^{th}$ element $R(j)$ has a value equal to the sum of the $j^{th}$ elements ($1 \leq j \leq k$) contained in their respective arrays R1 to Rn.

Moreover, the element processor 11a attains an array C whose $j^{th}$ element $C(j)$ has a value equal to the sum of the $j^{th}$ elements contained in their respective arrays C1 to Cn.

Further, the element processor 11a attains a sum entry set E which corresponds to the sum of the entry sets E1 to En.

Next, the element processor 11a selects a variable which can be eliminated with a minimum number of calculations, from among to-be-solved variables which have not yet been eliminated (a step S230).

The number of calculations required to eliminate the $S(w)^{th}$ variable can be derived by $R(S(w)) \times C(S(w))$. Hence, in the step S230, the element processor 11a needs only determine the value of w which results in the minimum value of $R(S(w)) \times C(S(w))$.

In the step S230, the element processor 11a does not count column entries representing coefficients associated with variables which have already been eliminated or row entries representing equations which have already been solved, nor does it count entries containing diagonal elements.

Next, the element processor 11a replaces the values of S(i) and S(w) contained in the replacement array S with each other (a step S240).

By so doing, the element processor 11a replaces the $i^{th}$ row of the entry set E and the row ($w^{th}$ row) representing the variable determined in the step S230 with each other, and also replaces the it column and the $w^{th}$ column with each other.

Next, the element processor 11a transmits, as a message, the replacement array S containing the elements replaced with each other to the nodes 11 to 1n through the mutual coupling network 10. The element processors 11a to 1na of the nodes 11 to 1n, which have received the replacement array S, derive fill-ins which take place at the time of eliminating the $i^{th}$ variable from their respective row sets as received, and add entries specifying the derived fill-ins to the entry sets which the element processors 11a to 1na have prepared (steps S251 to S25n).

The positions where the fill-ins take place in the individual row sets can be derived if the entries of all nonzero elements contained in the $i^{th}$ row of the upper right triangular matrix are attained. Accordingly, the element processors 11a to 1na can perform in a parallel fashion the step of adding the entries corresponding to the fill-ins to the entries set E1 to En.

When the nodes 11 to 1n have finished the steps S251 to S25n, the element processor 11a of the node 11 increments the value of the variable i by 1 (a step S260). Further, the element processor 11a determines whether the value of the variable i exceeds "m–1" or not (a step S270).

When the element processor 11a determines in the step S270 that the value of the variable i does not exceed "m–1", a return is made to the step S230. By repeating the steps S230 to S260, the optimum pivot order and the positions in which the fill-in elements take place can be attained.

When the element processor 11a determines in the step S270 that the value of the variable i exceeds m–1, the element processor 11a remotely access the local memories 11b to 1nb of the nodes 11 to 1n, and acquires the entry sets E1 to En therefrom. The element processor 11a compresses the matrix, and stores the compressed matrix data in the local memory 11b (a step S280).

Such a format as one described in "Templates for the Solution of Linear Systems: Building Blocks for Iterative Methods" (written by R. Barrett et al. and published in 1994), for example, can be adopted as the format in which the matrix data is compressed by the step S280.

When the step S280 has been finished, the symbolic calculation process ends and thereafter the numerical calculation process starts. In this process, the simultaneous linear equations, which the workstation 2 has sent to the parallel computer 1 as the coefficient matrix, are solved.

An example of the process for solving the simultaneous linear equations according to this embodiment will now be explained with reference to FIGS. 4 to Let it be assumed that the coefficient matrix, sent from the workstation 2 to the parallel computer 1, is a 6×6 square matrix in which the rows of elements are arranged in the following order as shown in FIG. 4:

[2, 0, −1, 0, −1, 0],
[0, 2, −1, −1, 0, 1],
[−1, −1, 3, 0, 0, 0],
[0, −1, 0, 2, −1, −1],
[−1, 0, 0, −1, 2, 0],
[0, −1, 0, −1, 0, 3]

Let it be further assumed that the coefficient matrix shown above is divided into a row set including the upper two rows, a row set including the intermediate two rows, and a row set including the lower two rows, as shown by broken lines in FIG. 4.

In order to facilitate understanding, let it be further assumed that the row set including the upper two rows is received by the node 11, the row set including the intermediate two rows is received by the node 12, and the row set including the lower two rows is received by the node 13.

In this case, in the steps S211 to S213, the nodes 11 to 13 add the entries specifying the nonzero elements contained in their respective row sets as received to the entry sets E1 to E3, respectively.

As a result, the entry sets E1 to E3 stored in the local memories 11b to 13b become the following, as shown in FIG. 5(a):

E1={<1, 1>,<1, 3>,<1, 5>,<2, 2>,<2, 3>,<2, 4>,<2, 6>}
E2={<3, 1>,<3, 2>,<3, 3>,<4, 2>,<4, 4>,<4, 5>,<4, 6>}
E3={<5, 1>,<5, 4>,<5, 5>,<6, 2>,<6, 4>,<6, 6>}

Further, as a result of the addition of the entries to the entry sets E1 to E3, the arrays R1 to R3 and C1 to C3 stored in the local memories 11b to 13b become the following, as shown in FIG. 5(a):

R1=[2, 3, 0, 0, 0, 0]
C1=[0, 0, 2, 1, 1, 1]

R2=[0, 0, 2, 3, 0, 0]

C2=[1, 2, 0, 0, 1, 1]

R3=[0, 0, 0, 0, 2, 2]

C3=[1, 1, 0, 2, 0, 0]

In the step S220, the variable i and the replacement array S, stored in the local memory 11b of the node 11, are initialized such that they become the following, as shown in FIG. 5(a):

i=1

S=[1, 2, 3, 4, 5, 6]

The pivoting process is carried out in the step S230. The arrays R and C at that point are as follows:

R=[2, 3, 2, 3, 2, 2]

C=[2, 3, 2, 3, 2, 2]

From the above, the value of w which results in the minimum value of $R(S(w)) \times C(S(w))$ is derived as "1."

Next, in the step S240, S(i) and S(w) are replaced with each other, and the replacement array S is sent as a message to the nodes 1 to 13. In this case, however, since "i" satisfies a relationship of "i=w=1" when the step S240 is executed first time, there is no difference between S(i) and S(w).

In the steps S251 to S253, the entries corresponding to fill-ins which take place at the time of eliminating the $S(i)^{th}$ variable are added to the entry sets E1 to E3.

As a result, as shown in FIG. 5(b), the entry sets E1 to E3 are updated as follows:

E1={<1, 1 >,<1, 3>,<1, 5>,<2, 2>,<2, 3>,<2, 4>,<2, 6>}

E2={<3, 1 >,<3, 2>,<3, 3>,<3, 5>,<4, 2>,<4, 4>,<4, 5>,<4, 6>}

E3={<5, 1 >,<5, 3>,<5, 4>,<5, 5>,<6, 2>,<6, 4>,<6, 6>}

As shown in FIG. 5(b), the individual elements contained in the arrays R1 to R3 and C1 to C3 are also updated as follows:

R1=[0, 3, 0, 0, 0, 0]

C1=[0, 0, 1, 1, 0, 1]

R2=[0, 0, 2, 3, 0, 0]

C2=[1, 2, 0, 0, 1, 1]

R3=[0, 0, 0, 0, 2, 2]

C4=[0, 1, 1, 2, 0, 0]

In the step S260, the variable i is incremented such that it becomes "i=2", as shown in FIG. 5(b). Then, the step S230 is executed again.

Figure 6:
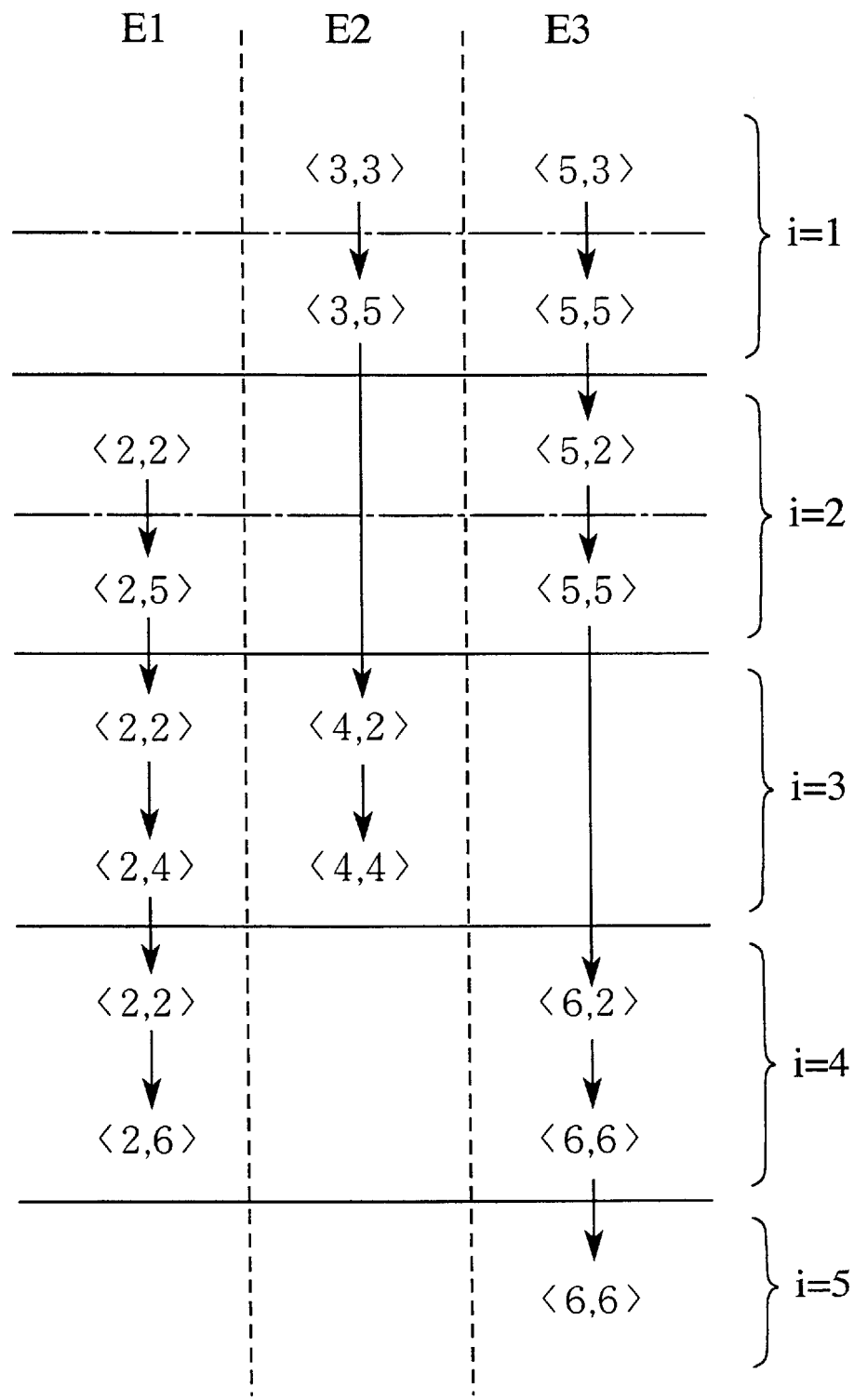
FIG. 6 is a diagram showing the order of addition and registration of entries used in the aforementioned example according to the first embodiment of the present invention.

The steps S230 to S260 are repeated until the variable i becomes "i=5(=6 −1)." While those steps are being repeated, the entries specifying the fill-ins are added to the entry sets E1 to E3 in the steps S251 to S253, as shown in FIG. 6.

When the variable i has become "i=5", the entry sets E1 to E3, the arrays R1 to R3 and C1 to C3, the variable i and the replacement array S are as follows, as shown in FIG. 5(c):

E1={<1, 1>,<1, 3>,<1, 5>,<2, 2>,<2, 3>,<2, 4>,<2, 5>,<2, 6>}

E2={<3, 1>,<3, 2>,<3, 3>,<3, 5>,<4, 2>,<4, 4>,<4, 5>,<4, 6>}

E3={<5, 1>,<5, 2>,<5, 3>,<5, 4>,<5, 5>,<6, 2>,<6, 4>,<6, 6>}

R1=[0, 0, 0, 0, 0, 0]

C1=[0, 0, 0, 0, 0, 0]

R2=[0, 0, 0, 0, 0, 0]

C2=[0, 0, 0, 0, 0, 0]

R3=[0, 0, 0, 0, 0, 0]

C3=[0, 0, 0, 0, 0, 0]

S=[1, 3, 5, 4, 2, 6]

Using the entry sets E1 to E3 finally attained through the above-described steps, the matrix data is compressed in the step S280 as shown in FIG. 7, and is stored in the local memory 11b of the node 11.

The number of entries added to the entry sets E through the above-described steps is 24, as seen from FIG. 5(c). However, the number of entries added per row set (per node) is 8.

Accordingly, the storage capacity of the areas which the nodes 11 to 13 need to reserve in their respective local memories 11b to 13b in order to store the entry sets E1 to E3, can be reduced to one third of the storage capacity of an area which a single node needs to reserve in its own local memory to store an entry set in the case where the single node executes the above-described steps.

Furthermore, each of the nodes 11 to 13 need not retain the entirety of the coefficient matrix. Each of the nodes 11 to 13 needs only retain a row set whose data amount is one third of the entire coefficient matrix.

Accordingly, the storage capacity of the local memory of each node may be approximately one third of the storage capacity of a conventional local memory. In the case where the storage capacity of the local memory of each node is equal to that of a conventional local memory, then a coefficient matrix which is approximately three times as large as the coefficient matrix of the maximum size which could be conventionally handled, can be dealt with in this embodiment.

Moreover, since the nodes 11 to 13 perform the respective steps S251 to S253 in a parallel fashion as shown in FIG. 6, the number of steps required to add and register the entries is nine in total. In the case where a single node performs the process for adding and registering the entries, seventeen steps are necessary in total. Accordingly, the time required to complete the process for adding and registering the entries according to this embodiment is approximately one second of that in the case where a single node performs the process.

According to this embodiment, as described above, the nodes 11 to 1n of the parallel computer 1 execute in a parallel fashion the steps of the symbolic calculation process which is the first procedure involved in the process for solving simultaneous linear equations.

In this case, the nodes 11 to 1n need only store their corresponding row sets forming the coefficient matrix in their respective local memories 11b to 1nb. Further, the local memories 11b to 1nb need only retain the entry sets which are in one-to-one correspondence with their respective row sets stored therein.

Therefore, the capacity of the local memories 11b to 1nb may be smaller than that of a conventional local memory in the case of solving simultaneous linear equations through use of a single coefficient matrix.

When the storage capacity of the local memories 11b to 1nb is equal to that of a conventional local memory, then the simultaneous linear equations can be solved using a coefficient matrix larger than that employed conventionally.

Further, the plurality of nodes perform in a parallel fashion the steps of adding the entries to the entry sets E1 to E3. Accordingly, the time required to complete the addition of the entries is shorter than that in a conventional case.

Moreover, by transferring the replacement array S within the node 11 and from the node 11 to the other nodes 12 to 1n, each of the nodes can derive fill-in elements without having to exchange the matrix or the row sets with each other.

Second Embodiment

Explained in the second embodiment is the case where the present invention is applied to a parallel circuit simulation which involves solving simultaneous linear equations.

In also the second embodiment, the parallel computer 1 illustrated in FIG. 1 can be adopted as hardware which performs a parallel circuit simulation.

In the second embodiment, however, circuit connection information concerning a parallel circuit to be simulated is stored as a library in the external storage device of the workstation 2. The circuit connection information is read out from the library in accordance with instructions from the input device 21, and is input to the parallel computer 1.

Figure 8:
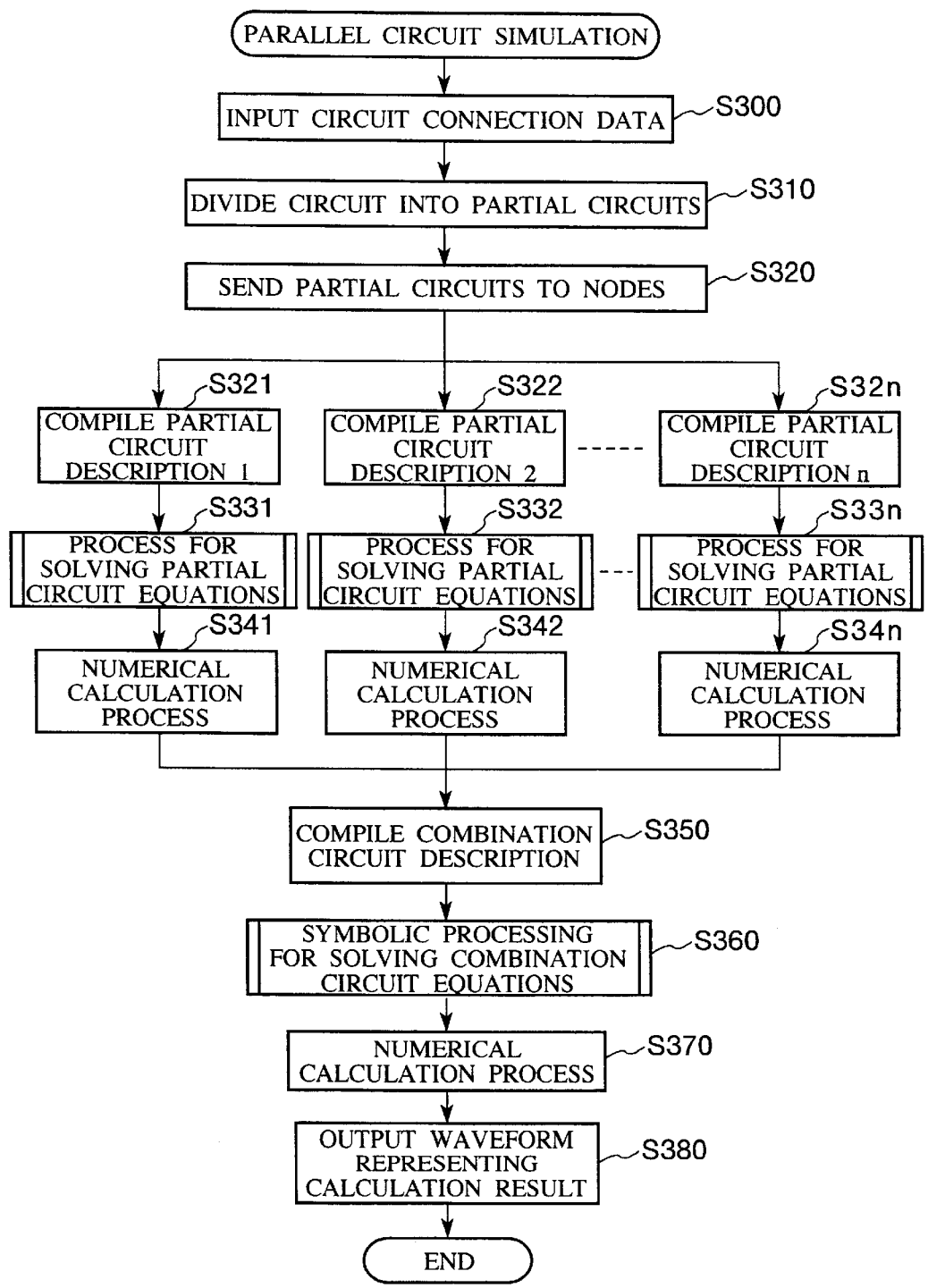
FIG. 8 is a flowchart showing a parallel circuit simulation process according to the second embodiment of the present invention.

A parallel circuit simulation process, which the parallel computer 1 illustrated in FIG. 1 executes in the second embodiment, will now be described with reference to FIG. 8.

When the process starts, a user supplies the circuit connection information, stored as the library in the external storage device 22 of the workstation 2, to the parallel computer 1 through the mutual coupling network 10 by operating the input device 21 (a step S300).

Of the element processors 11a to 1La of the nodes 11 to 1L in the parallel computer 1, the element processor of the node which has received the circuit connection information divides a circuit specified by the input circuit connection information into a plurality of partial circuits of the same number (i.e., "L") as the number of nodes 11 to 1L. The division of the circuit into the partial circuits is performed by a method described in, for example, Japanese Patent Publication No. 9-319784. (In order to facilitate understanding, let it be assumed that the node 11 has received the circuit connection information.)

Then, the element processor 11a of the node 11 transmits information, which specifies each of the partial circuits obtained as a result of the division, to the nodes 12 to 1L through the mutual coupling network 10 (a step S310). In the node 11, the information is transmitted by the inter-process communication.

The element processor 11a of the node 11 and the element processors 12a to 1La of the nodes 12 to 1L, which have received the information specifying the partial circuits, convert the information (a compiling operation; steps S321 to S32L) to object data (matrices representing the partial circuits and parameters representing the individual elements included in the partial circuits). The steps S321 to 32L are those for enabling a simulation, which will be explained later, to be performed with high efficiency.

Further, the element processors 11a to 1La conduct symbol processing to solve simultaneous linear equations associated with the partial circuits specified by the received information. The symbol processing for solving the simultaneous linear equations is performed in accordance with the flowchart of FIG. 8 (steps S331 to S33n).

Using the results obtained by the symbol processing in the steps S331 to S33L, the element processors 11a to 1La perform the numerical calculation process. Thereafter, the element processors transmit the result of the numerical calculation process to one node through the mutual coupling network 10 (steps S341 to S34L) (in order to facilitate understanding, let it be assumed that the element processors transmit the result of the numerical calculation process to the node 11). In the node 11 during the step S341, the result of the numerical calculation process is transmitted by the inter-process communication.

The element processor 11a of the node 11, which has received the result of the numerical calculation process in connection with the partial circuits, performs compiling for a combination circuit and creates a matrix representing the combination circuit, based on the object data representing the degeneracy models of the partial circuits and combination circuit information (a step S350).

Next, the element processor 11a divides the created matrix into a plurality of row sets. Then, the nodes execute in a parallel fashion the symbolic calculation process for solving combination circuit equations, in accordance with the flowchart of FIG. 8 (step S360).

When the numerical calculation process has been finished and the matrix has been compressed and stored in the step S360, the element processor of the node which includes the local memory containing the matrix stored therein, performs the numerical calculation process (a step S370) (the numerical calculation process is shown as the steps S140 and S150 in the flowchart of FIG. 2).

Having finished the step S370, the element processor outputs the result of the calculation process as information showing the waveform of a simulated terminal to the workstation 2 through the mutual coupling network 10 (a step S380). The process shown in FIG. 8 is thus finished.

According to the second embodiment, as described above, the nodes 11 to 1L perform parallel processing in order to solve the combination circuit equations. This enables the circuit simulation to be performed at higher speed than a conventional circuit simulation. Moreover, the circuit simulation is free from a restriction owing to the capacity of the local memories 11b to 11c. Therefore, the circuit simulation can be effected on a large scale.

Modifications of Embodiments

The present invention is not limited to the first or second embodiment described above, and various modifications are possible. Modifications of the embodiments will be now be explained.

In the first embodiment, explanations are made assuming that the coefficient matrix, the processing of which has been requested from the workstation 2, are divided into n row sets. However, the coefficient matrix which the workstation 2 has requested the parallel computer 1 to process may not be divided into the row sets in advance. In this case, the node which has received the processing request can divide the coefficient matrix into row sets of an arbitrary number equal to or less than the number of nodes of the parallel computer 1.

In the first and second embodiments, the parallel computer 1 illustrated in FIG. 1 carries out procedures other than the inputting of data (the coefficient matrix of the simultaneous linear equations and the circuit connection information) to be processed.

However, the parallel computer 1 and any other vector calculator may carry out the symbolic calculation process and the numerical calculation process, respectively. Further, the workstation 2 may execute steps other than those to be executed in a parallel fashion, and may request the parallel computer 1 to carry out the steps to be executed in a parallel fashion.

According to the second embodiment, the nodes perform the symbolic calculation process in one-to-one correspondence with the partial circuits in order to the simultaneous linear equations associated with the partial circuits. However, the nodes may perform also the symbolic calculation process in a parallel fashion, as shown in the flowchart of FIG. 3.

Figure 9:
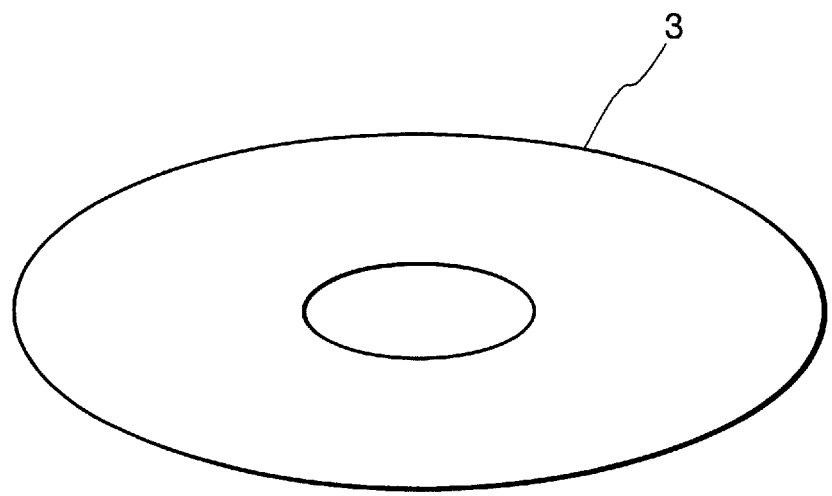
FIG. 9 is a diagram which illustrates a CD-ROM having a program stored therein for causing a computer to accomplish the embodiments of the present invention.

Moreover, the embodiments of the present invention can be realized not only using a dedicated system, but also a general computer system. For example, a symbolic calculation system which executes the above-described operations can be attained by installing a program for executing the above-described operations into a personal computer from a medium (such as a floppy disk or the CD-ROM 3 illustrated in FIG. 9.) containing the program stored therein.

Further, the medium from which the program is supplied to the computer may be a communication medium (which temporarily stores the program as in the case of a communication line, a communication network and a communication system). For example, the program may be posted on a bulletin board (BBS) for the communication network, and may be distributed through the network.

Figure 10:
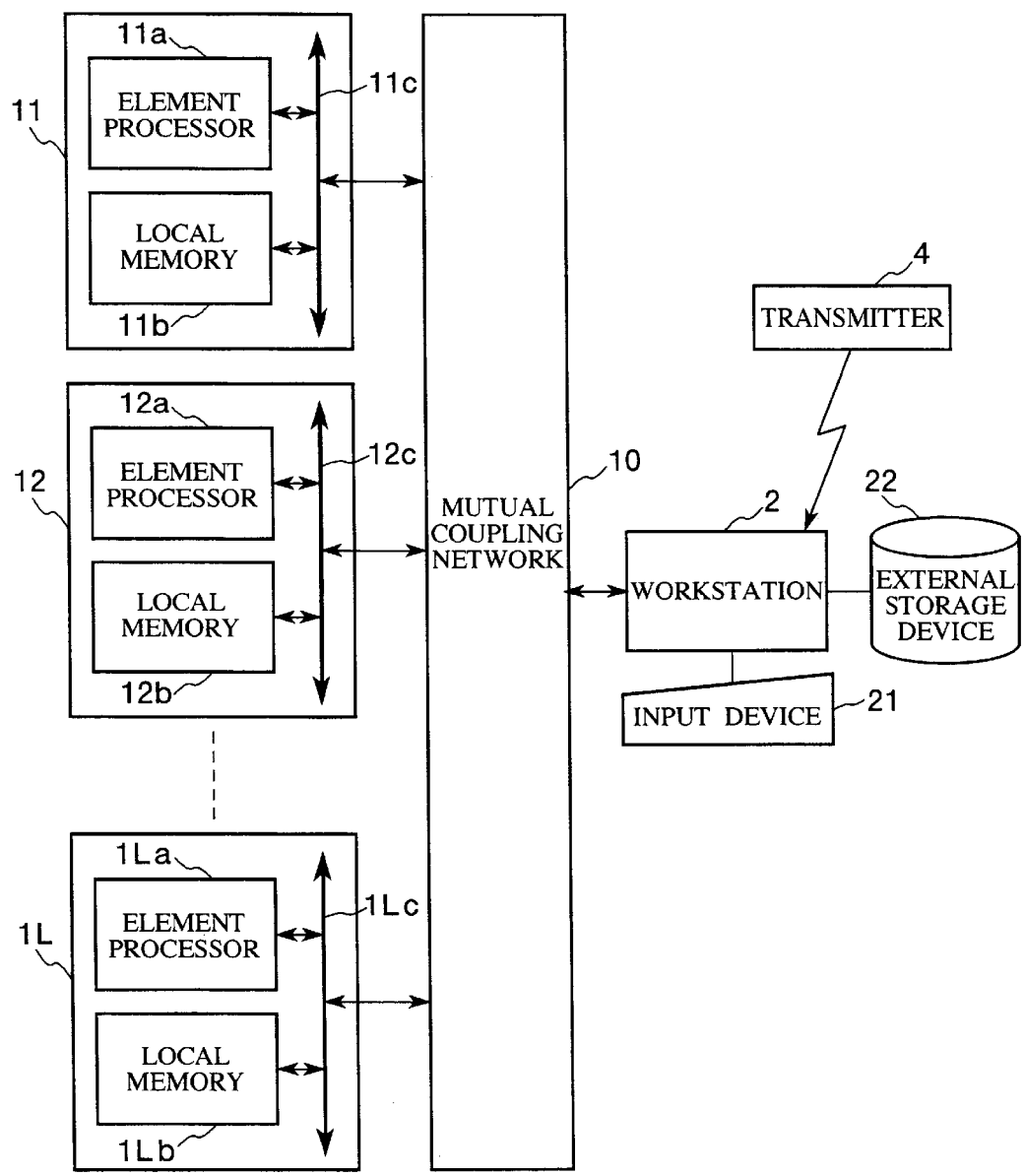
FIG. 10 is a diagram illustrating a structure for distributing, by a carrier wave, the program for causing the computer to accomplish the embodiments of the present invention.

Moreover, as shown in FIG. 10, the program can be distributed in the manner of supplying, from a transmitter 4, for example, a modulated wave obtained by modulating a carrier wave in accordance with the program. In this case, the workstation or any other appropriate unit may receive the modulated wave, demodulate the program, and supply the demodulated program to the local memories 11$b$ to 1L$b$.

The distributed program is run and executed under the control of an OS, in the same manner as other application programs, in order to carry out the above-described processes.

In the case where the OS undertakes the execution of some of the steps involved in the above-described processes or forms a part of one structural element of the present invention, the steps to be executed by the OS may be excluded from the program, and the program from which those steps have been thus excluded may be stored in the medium. In this case also, the program stored in the medium is one for causing the computer to realize individual functions or processes.

According to the present invention, as described above, the time required for completing the symbolic calculation to solve simultaneous linear equations is reduced, while the scale of a matrix which can be handled is enhanced.

Moreover, a large-scale circuit simulation can be effected at high speed.

What is claimed is:

1. A symbolic calculation system comprising a plurality of nodes each having an element processor and local memory including a program area which stores a predetermined program to be executed by the corresponding element processor and a work area used by said element processor, and an interconnection network which interconnects said plurality of nodes, wherein said element processors of said plurality of nodes are capable of cooperating with each other, said symbolic calculation system comprising a first computer which is connected to said interconnection network and which divides a matrix, representing the simultaneous linear equations to be solved, into a plurality of row sets each comprising at least one of rows of said matrix, wherein each of said plurality of nodes corresponds to each row set divided by said first computer, and each of said element processor executes the predetermined program stored in said program area thereby each of said plurality of nodes:

adds entries specifying nonzero elements contained in the row sets associated with said plurality of nodes to a plurality of entry sets which are in one-to-one correspondence with said plurality of row sets;

sequentially attains a first variable which specifies an unknown that can be eliminated with a minimum number of calculations, among a plurality of unknowns which are designated by a second variable whose value sequentially changes from 1 up to a value equal to the number of rows included in said matrix, by cooperating with other nodes;

replaces one row specified by said first variable and another row specified by said second variable with each other, among the rows of said matrix, by cooperating with other nodes;

replaces one column specified by said first variable and another column specified by said second variable with each other, among columns of said matrix, by cooperating with other nodes;

obtains fill-ins belonging to the associated row sets from a plurality of fill-ins which occur in eliminating the unknown in regard to said matrix including the rows and/or columns replaced with each other, and further adding entries specifying the obtained fill-ins to said plurality of entry sets to said entry sets.

2. The symbolic calculation system according to claim 1, wherein said first computer is realized by any one of said plurality of nodes.

3. The symbolic calculation system according to claim 2, any one of said plurality of nodes attains the first variable which determines the minimum number of calculations.

4. The symbolic calculation system according to claim 2, any one of said plurality of nodes replaces one row specified by said first variable and another row specified by said second variable with each other.

5. The symbolic calculation system according to claim 2, any one of said plurality of nodes replaces one column specified by said first variable and another column specified by said second variable with each other.

6. The symbolic calculation system according to claim 2 further comprising a second computer which is connected to said interconnection network and which compresses said matrix based on contents of said plurality of entry sets to which the entries have been added.

7. The symbolic calculation system according to claim 6, wherein said second computer is realized by any one of said plurality of nodes.

8. The symbolic calculation system according to claim 6 further comprising a third computer which is connected to said interconnection network, and which creates a lower left rectangular matrix and an upper right triangular matrix, based on said matrix as compressed, and which performs a forward substitution with respect to said lower left rectangular matrix and performs a backward substitution with respect to said upper right rectangular matrix by using solutions obtained as a result of the forward substitution, in order to create data representing solutions of the simultaneous linear equations.

9. The symbolic calculation system according to claim 8, wherein said third computer is realized by any one of said plurality of nodes.

10. A parallel circuit simulation system comprising a plurality of nodes each having an element processor and local memory including a program area which stores a predetermined program to be executed by the corresponding element processor and a work area used by said element processor, and an interconnection network which interconnects said plurality of nodes, wherein said element processors of said plurality of nodes are capable of cooperating with each other, said parallel circuit simulation system comprising a first computer which is connected to said interconnection network, said first computer dividing a circuit to be simulated into a plurality of circuit pieces, preparing circuit piece matrix representing circuit equations corresponding to divided circuit pieces respectively, and transmitting the prepared circuit piece matrix to said plurality of nodes, wherein each of said element processor executes the predetermined program stored in said program area thereby said plurality of nodes:

executes symbolic calculation on the circuit piece matrix transmitted by said first computer, executes numeric calculation on the result of the symbolic calculation executed by each node, and resolves the circuit equation represented by the received circuit piece matrix, said parallel circuit simulation system comprises:

a second computer which is connected to said interconnection network and which prepares a circuit matrix of connected circuits including connected circuit pieces, based on the obtained resolution of the circuit equation for the circuit pieces; and a third computer which is connected to said interconnection network, and which divides the prepared circuit matrix of the connected circuits into a plurality of row sets each comprising at least one of rows of said matrix, and which transmits the plurality of row sets to said plurality of nodes respectively, wherein each element processor executes the predetermined program stored in the program area, thereby each of said plurality of nodes further:

adds entries specifying nonzero elements contained in the row sets associated with said plurality of nodes to a plurality of entry sets which are in one-to-one correspondence with said plurality of row sets;

sequentially attains a first variable which specifies an unknown that can be eliminated with a minimum number of calculations, among a plurality of unknowns which are designated by a second variable whose value sequentially changes from 1 up to a value equal to the number of rows included in said matrix, by cooperating with other nodes;

replaces one row specified by said first variable and another row specified by said second variable with each other, among the rows of said matrix, by cooperating with other nodes;

replaces one column specified by said first variable and another column specified by said second variable with each other, among columns of said matrix, by cooperating with other nodes;

obtains fill-ins belonging to the associated row sets from a plurality of fill-ins which occur in eliminating the unknown in regard to said matrix including the rows and/or columns replaced with each other, and further adds entries specifying the obtained fill-ins to said plurality of entry sets to said entry sets.

11. The parallel circuit simulation system according to claim 10, wherein said first computer is realized by any one of said plurality of nodes.

12. The parallel circuit simulation system according to claim 10, wherein said second computer is realized by any one of said plurality of nodes.

13. The parallel circuit simulation system according to claim 10, wherein said third computer is realized by any one of said plurality of nodes.

14. The parallel circuit simulation system according to claim 10 further comprising a fourth computer which is connected to said interconnection network, and which compresses said matrix based on contents of said plurality of entry sets to which the entries have been added.

15. The parallel circuit simulation system according to claim 14, wherein said fourth computer is realized by any one of said plurality of nodes.

16. A symbolic calculation system for performing a symbolic calculation to solve simultaneous linear equations, comprising:

a matrix divider which divides a matrix, representing the simultaneous linear equations to be solved, into a plurality of row sets each comprising at least one of rows of said matrix;

a plurality of first entry adders, each of which is associated with one of said plurality of row sets divided by said matrix divider, and which add entries specifying nonzero elements contained in the row sets associated with said plurality of first entry adders to a plurality of entry sets which are in one-to-one correspondence with said plurality of row sets;

a pivot selector which sequentially attains a first variable specifying an unknown that can be eliminated with a minimum number of calculations, among a plurality of unknowns which are designated by a second variable whose value sequentially changes from 1 up to a value equal to the number of rows included in said matrix;

a pivot replacer which replaces one row specified by said first variable and another row specified by said second variable with each other, among the rows of said matrix, and replaces one column specified by said first variable and another column specified by said second variable with each other, among columns of said matrix; and a plurality of second entry adders, provided in one-to-one correspondence with said plurality of first entry adders, and which obtain fill-ins belonging to the associated row sets from a plurality of fill-ins that occur in eliminating the unknown in regard to said matrix including the rows and columns replaced with each other by said pivot replacer, and which add entries specifying the obtained fill-ins to said plurality of entry sets to which the entries have been added by said plurality of first entry adders that are in one-to-one correspondence with said plurality of second entry adders.

17. The symmetric calculation system according to claim 16, wherein:

said pivot replacer comprises a replacement array storage which stores a replacement array specifying the replaced rows and columns included in said matrix, and a supplier which supplies the replacement array stored in said replacement array storage to each of said plurality of second entry adders; and in accordance with the replacement array supplied from said pivot replacer, each of said plurality of second entry adders obtains the fill-ins associated therewith from said plurality of fill-ins which occur in eliminating the unknown in regard to said matrix including the replaced rows and columns.

18. The symbolic calculation system according to claim 16, wherein:

said symbolic calculation system further comprises a plurality of nodes each including one of said plurality of first entry adders and a corresponding one of said plurality of second entry adders;

the first and second entry adders included in each of said plurality of nodes respectively comprise an in-row entry number storage which stores an in-row entry number array whose elements represent the number of entries contained in each row included in an associated one of said plurality of row sets and an in-column entry number storage which stores an in-column entry number array whose elements represent the number of entries contained in each column included in the associated one of said plurality of row sets; and said pivot selector comprises a first adder which obtains first addition results by adding together elements corresponding in order to each other, among the elements forming in-row entry number arrays stored in a plurality of in-row entry number storages which said plurality of first entry adders comprise, a second adder which obtains second addition results by adding together elements corresponding in order to each other, among the elements forming in-column entry number arrays stored in a plurality of in-column number storages which said plurality of second entry adders comprise, a multiplier which obtains multiplication results by multiplying together ones of the first and second addition results which correspond to each row-column pair containing a common diagonal element in said matrix, a specifier which specifies to which row-column pair in said matrix a minimum one of values of the multiplication results corresponds, and a determiner which determines, as said first variable, a value representing the row-column pair specified by said specifying means.

19. The symbolic calculation system according to claim 18, wherein:

said pivot replacer comprises a replacement array storage which stores a replacement array specifying the replaced rows and columns included in said matrix, and a supplier which supplies the replacement array stored in said replacement array storage to each of said plurality of second entry adders; and in accordance with the replacement array supplied from said pivot replacer, each of said plurality of second entry adders obtains the fill-ins associated therewith from said plurality of fill-ins which occur in eliminating the unknown in regard to said matrix including the replaced rows and columns.

20. The symbolic calculation system according to claim 19, further comprising a matrix compressor which compresses said matrix, based on contents of said plurality of entry sets to which the entries have been added by said plurality of first entry adders and said plurality of second entry adders.

21. The symbolic calculation system according to claim 20, wherein said matrix compressor includes a compressor which compresses said matrix by creating data representing elements in said matrix which are specified by the entries contained in said plurality of entry sets to which the entries have been added by said plurality of first entry adders and said plurality of second entry adders.

22. The symbolic calculation system according to claim 20, further comprising a numerical value calculator which creates a lower left rectangular matrix and an upper right triangular matrix, based on said matrix as compressed, and performs a forward substitution with respect to said lower left rectangular matrix and performs a backward substitution with respect to said upper right rectangular matrix by using solutions obtained as a result of the forward substitution, in order to create data representing solutions of the simultaneous linear equations.

23. A symbolic calculation system for performing a symbolic calculation to solve simultaneous linear equations, comprising:

a plurality of first entry adders, each of which is associated with one of a plurality of row sets each comprising at least one of different rows of a matrix representing the simultaneous linear equations to be solved, and which add entries specifying nonzero elements contained in the row sets associated with said plurality of first entry adders to a plurality of entry sets that are in one-to-one correspondence with said plurality of row sets;

a pivot selector which sequentially attains a first variable specifying an unknown that can be eliminated with a minimum number of calculations, among a plurality of unknowns which are designated by a second variable whose value sequentially changes from 1 up to a value equal to the number of rows included in said matrix;

a pivot replacer which replaces one row specified by said first variable and another row specified by said second variable with each other, among the rows of said matrix, and which replaces one column specified by said first variable and another column specified by said second variable, among columns of said matrix; and a plurality of second entry adders, provided in one-to-one correspondence with said plurality of first entry adders, and which obtain fill-ins belonging to the associated row sets from a plurality of fill-ins that occur in eliminating the unknown in regard to said matrix including the rows and columns replaced with each other by said pivot replacer, and which add entries specifying the obtained fill-ins to said plurality of entry sets to which the entries have been added by said plurality of first entry adders that are in one-to-one correspondence with said plurality of second entry adders.

24. The symbolic calculation system according to claim 23, further comprising a matrix divider which divides said matrix into said plurality of row sets.

25. The symbolic calculation system according to claim 23, wherein:

said pivot replacer comprises a replacement array storage which stores a replacement array specifying the replaced rows and columns included in said matrix, and a supplier which supplies the replacement array stored in said replacement array storage to each of said plurality of second entry adders; and in accordance with the replacement array supplied from said pivot replacer, each of said plurality of second entry adders obtains the fill-ins associated therewith from said plurality of fill-ins which occur in eliminating the unknown in regard to said matrix including the replaced rows and columns.

26. The symbolic calculation system according to claim 23, wherein:

said symbolic calculation system further comprises a plurality of nodes each including one of said plurality of first entry adders and a corresponding one of said plurality of second entry adders;

the first and second entry adders included in each of said plurality of nodes respectively comprise an in-row entry number storage which stores an in-row entry number array whose elements represent the number of entries contained in each row included in an associated one of said plurality of row arrays and an in-column entry number storage which stores an in-column entry number array whose elements represent the number of entries contained in each column included in the associated one of said plurality of row sets; and said pivot selector comprises
- a first adder which obtains first addition results by adding together elements corresponding in order to each other, among the elements forming in-row entry number arrays stored in a plurality of in-row entry number storing storages which said plurality of first entry adders comprise,
- a second adder which obtains second addition results by adding together elements corresponding in order to each other, among the elements forming in-column entry number arrays stored in a plurality of in-column number storages which said plurality of second entry adders comprise,
- a multiplier which obtains multiplication results by multiplying together ones of the first and second addition results which correspond to each row-column pair containing a common diagonal element in said matrix,
- a specifier which specifies to which row-column pair in said matrix a minimum one of values of the multiplication results corresponds, and
- a determiner which determines, as said first variable, a value representing the row-column pair specified by said specifying means.

27. The symbolic calculation system according to claim 23, further comprising a matrix compressor which compresses said matrix, based on contents of said plurality of entry sets to which the entries have been added by said plurality of first entry adders and said plurality of second entry adders.

28. The symbolic calculation system according to claim 27, further comprising a numerical value calculator which creates a lower left rectangular matrix and an upper right triangular matrix, based on said matrix as compressed, and performs a forward substitution with respect to said lower left rectangular matrix and performs a backward substitution with respect to said upper right rectangular matrix by using solutions obtained as a result of the forward substitution, in order to create data representing solutions of the simultaneous linear equations.

29. A symbolic calculation method for performing a symbolic calculation to solve simultaneous linear equations, comprising:
- dividing a matrix, which represents the simultaneous linear equations to be solved, into a plurality of row sets each comprising at least one of rows of said matrix;
- adding, in parallel, entries specifying nonzero elements contained in said plurality of row sets divided by said dividing to a plurality of entry sets which are in one-to-one correspondence with said plurality of row sets;
- sequentially attaining a first variable which specifies an unknown that can be eliminated with a minimum number of calculations, among a plurality of unknowns which are designated by a second variable whose value sequentially changes from 1 up to a value equal to the number of rows included in said matrix;
- replacing one row specified by said first variable and another row specified by said second variable with each other, among the rows of said matrix, and replacing one column specified by said first variable and another column specified by said second variable with each other, among columns of said matrix; and
- obtaining, in parallel, fill-ins belonging to said plurality of row sets from a plurality of fill-ins which occur in eliminating the unknown in regard to said matrix including the rows and columns replaced with each other by said replacing, and adding, in parallel, entries specifying the obtained fill-ins to said plurality of entry sets to which the entries specifying the nonzero elements contained in said plurality of row sets have been added in parallel.

30. The symbolic calculation method according to claim 29, further comprising compressing said matrix, based on contents of said plurality of entry sets to which the entries specifying the nonzero elements contained in said plurality of row sets and the entries specifying the obtained fill-ins have been added.

31. A parallel circuit simulation system comprising:
- a circuit divider which divides a circuit to be simulated into partial circuits;
- a plurality of partial circuit matrix calculators, each of which is associated with one of said partial circuits divided by said circuit divider, and which create partial circuit matrices representing circuit equations of the partial circuits associated with said plurality of partial circuit matrix calculators;
- a plurality of partial circuit symbolic calculators, each of which is associated with one of said partial circuits, and which perform symbolic calculations based on the partial circuit matrices representing the circuit equations of the associated partial circuits and created by said plurality of partial circuit matrix calculators;
- a plurality of partial circuit numerical calculators, each of which is associated with one of said partial circuits, and which solve the circuit equations of the associated partial circuits by performing numerical calculations using calculation results obtained as a result of the symbolic calculations which said plurality of partial circuit symbolic calculators have performed based on the partial circuit matrices representing the circuit equations of the associated circuit sections;
- a combination circuit matrix calculator which creates a combination circuit matrix representing circuit equations of a combination circuit that is a combination of said partial circuits, based on solutions of the circuit equations of said partial circuits which have been solved by said plurality of partial circuit numerical calculators;
- a combination circuit symbolic calculator which performs symbolic calculations based on the combination circuit matrix created by said combination circuit matrix calculator; and
- a combination circuit numerical calculator which solves the circuit equations of said combination circuit by performing numerical calculations using calculation results obtained as a result of the symbolic calculations performed by said combination circuit symbolic calculator;
- wherein said combination circuit symbolic calculator comprises:
  - a matrix divider which divides said combination circuit matrix into a plurality of row sets each comprising at least one of rows of said combination circuit matrix;
  - a plurality of first entry adders, each of which is associated with one of said plurality of row sets divided by said matrix divider, and which add entries specifying nonzero elements contained in the row sets associated with said plurality of first entry adders to a plurality of entry sets that are in one-to-one correspondence with said plurality of row sets;

a pivot selector which sequentially attains a first variable specifying an unknown that can be eliminated with a minimum number of calculations, among a plurality of unknowns which are designated by a second variable whose value sequentially changes from 1 up to a value equal to the number of rows included in said combination circuit matrix;

a pivot replacer which replaces one row specified by said first variable and another row specified by said second variable with each other, among the rows of said combination circuit matrix, and which replaces one column specified by said first variable and another column specified by said second variable with each other, among columns of said combination circuit matrix; and a plurality of second entry adders, provided in one-to-one correspondence with said plurality of first entry adders, and which obtain fill-ins belonging to the associated row sets from a plurality of fill-ins that occur in eliminating the unknown in regard to said combination circuit matrix including the rows and columns replaced with each other by said pivot replacer, and which add entries specifying the obtained fill-ins to said plurality of entry sets to which the entries have been added by said plurality of first entry adders that are in one-to-one correspondence with said plurality of second entry adders.

32. The parallel circuit simulation system according to claim 31, wherein:

said combination circuit symbolic calculator further comprises a plurality of nodes each including one of said plurality of first entry adders and a corresponding one of said plurality of second entry adders;

the first and second entry adders included in each of said plurality of nodes respectively comprise an in-row entry number storage which stores an in-row entry number array whose elements represent the number of entries contained in each row included in an associated one of said plurality of row sets and an in-column entry number storage which stores an in-column entry number array whose elements represent the number of entries contained in each column included in the associated one of said plurality of row sets; and said pivot selector comprises a first adder which obtains first addition results by adding together elements corresponding in order to each other, among the elements forming in-row entry number arrays stored in a plurality of in-row entry number storages which said plurality of first entry adders comprise, a second adder which obtains second addition results by adding together elements corresponding in order to each other, among the elements forming in-column entry number arrays stored in a plurality of in-column number storages which said plurality of second entry adders comprise, a multiplier which obtains multiplication results by multiplying together ones of the first and second addition results which correspond to each row-column pair containing a common diagonal element in said combination circuit matrix, a specifier which specifies to which row-column pair in said combination circuit matrix a minimum one of values of the multiplication results corresponds, and a determiner which determines, as said first variable, a value representing the row-column pair specified by said specifying means.

33. The parallel circuit simulation system according to claim 31, further comprising a matrix compressor which compresses said combination circuit matrix, based on contents of said plurality of entry sets to which the entries have been added by said plurality of first entry adders and said plurality of second entry adders.

34. A computer usable storage medium containing a computer readable program stored therein for causing a computer to serve as:

a matrix divider which divides a matrix, representing simultaneous linear equations to be solved, into a plurality of row sets each comprising at least one of rows of said matrix;

a plurality of first entry adders, each of which is associated with one of said plurality of row sets divided by said matrix divider, and which add entries specifying nonzero elements contained in the row sets associated with said plurality of first entry adders to a plurality of entry sets that are in one-to-one correspondence with said plurality of row sets;

a pivot selector which sequentially attains a first variable specifying an unknown that can be eliminated with a minimum number of calculations, among a plurality of unknowns which are designated by a second variable whose value sequentially changes from 1 up to a value equal to the number of rows included in said matrix;

a pivot replacer which replaces one row specified by said first variable and another row specified by said second variable with each other, among the rows of said matrix, and which replaces one column specified by said first variable and another column specified by said second variable with each other, among columns of said matrix; and a plurality of second entry adders, provided in one-to-one correspondence with said plurality of first entry adders, and which obtain fill-ins belonging to the associated row sets from a plurality of fill-ins which occur in eliminating the unknown in regard to said matrix including the rows and columns replaced with each other by said pivot replacer, and which add entries specifying the obtained fill-ins to said plurality of entry sets to which the entries have been added by said plurality of first entry adders that are in one-to-one correspondence with said plurality of second entry adders.

35. A program signal embedded in a carrier wave, for causing a computer to serve as:

a matrix divider which divides a matrix, representing simultaneous linear equations to be solved, into a plurality of row sets each comprising at least one of rows of said matrix;

a plurality of first entry adders, each of which is associated with one of said plurality of row sets divided by said matrix dividers, and which add entries specifying nonzero elements contained in the row sets associated with said plurality of first entry adders to a plurality of entry sets that are in one-to-one correspondence with said plurality of row sets;

a pivot selector which sequentially attains a first variable specifying an unknown that can be eliminated with a minimum number of calculations, among a plurality of unknowns which are designated by a second variable whose value sequentially changes from 1 up to a value equal to the number of rows included in said matrix;

a pivot replacer which replaces one row specified by said first variable and another row specified by said second variable with each other, among the rows of said matrix, and which replaces one column specified by said first variable and another column specified by said second variable with each other, among columns of said matrix; and a plurality of second entry adders, provided in one-to-one correspondence with said plurality of first entry adders, and which obtain fill-ins belonging to the associated row sets from a plurality of fill-ins that occur in eliminating the unknown in regard to said matrix including the rows and columns replaced with each other by said pivot replacer, and which add entries specifying the obtained fill-ins to said plurality of entry sets to which the entries have been added by said plurality of first entry adders that are in one-to-one correspondence with said plurality of second entry adders.

* * * * *